United States Patent [19]
Andersen et al.

[11] Patent Number: 5,375,890
[45] Date of Patent: Dec. 27, 1994

[54] THERMO LOCK-N-SEAL TUBE END FOR POLYETHYLENE PIPE

[76] Inventors: John I. Andersen, 1317 E. 6500 N., Idaho Falls, Id. 83401; Michael J. Andersen, 2619 Mesa, Idaho Falls, Id. 83401; Gary Harrell, HCR1 Box 224, Plainview, Tex. 79072

[21] Appl. No.: 238,975

[22] Filed: May 6, 1994

Related U.S. Application Data

[63] Continuation of Ser. No. 933,744, Aug. 24, 1992, abandoned.

[51] Int. Cl.$^5$ ............................................. F16L 13/14
[52] U.S. Cl. ..................................... 285/21; 285/382.2
[58] Field of Search ................. 285/21, 174, 239, 260, 285/382.2

[56] References Cited

U.S. PATENT DOCUMENTS

| | | | |
|---|---|---|---|
| 3,314,696 | 4/1967 | Ferguson et al. | 285/174 |
| 4,333,672 | 6/1982 | Arthur et al. | 285/382.2 |
| 4,359,812 | 11/1982 | Haag et al. | 285/382.2 |
| 4,997,214 | 3/1991 | Reese | 285/21 |
| 5,110,163 | 5/1992 | Benson et al. | 285/382.2 |

Primary Examiner—P. Austin Bradley
Assistant Examiner—Jeffrey T. Knapp
Attorney, Agent, or Firm—Trask, Britt & Rossa

[57] ABSTRACT

A tube end formed of any suitable material having the shape of a truncated cylinder that is forced over the end of a polyethylene pipe and prior or post heat-treated to provide a THERMO LOCK-N-SEAL TM interface between the OD of the polyethylene pipe and the ID of the tube end by melting a portion of the OD of the polyethylene tube sufficient to cause thermal plastic flow of the polyethylene into conformity with the surface of the ID of the tube end.

8 Claims, 6 Drawing Sheets

THERMO LOCK-N-SEAL TUBE END FOR POLYETHYLENE PIPE

This application is a continuation of application Ser. No. 07/933,744, filed Aug. 24, 1992, now abandoned.

FIELD OF THE INVENTION

This invention relates to a tube end for a polyethylene pipe and, in particular, to a tube end having a surface indentation in the ID and a means and method for providing a hydraulic seal and a mechanical locked interface between the tube end and the polyethylene pipe by melting a portion of the outer pipe wall to conform with the inner tube end wall.

BACKGROUND OF THE INVENTION

It is well known in the art to have cylindrical tube ends containing grooves that are forced on the end of polyethylene tubes. Such tubes are then assembled end-to-end by means of clamps circumscribing the grooves and hydraulically sealed by means of O-rings and otherwise. It is difficult to mechanically lock the tube end in place on the polyethylene pipe and to provide a hydraulic seal between the tube end and the polyethylene pipe due to the property of polyethylene of being impervious to adhesives. Some of the methods known in the art to provide a hydraulic seal as well as to retain mechanical integrity between the tube end and the polyethylene pipe are: (a) drive screws are placed through the wall of the tube end into the pipe to provide mechanical rigidity; (b) machining a groove into the polyethylene pipe at the location under the groove and to dispose epoxy cement into the machined groove to prevent deformation of the OD of the polyethylene pipe and to provide a hydraulic seal between the polyethylene pipe and the tube end; or (c) drill a series of holes in an annular row near one end of the tube end before or after forcing the tube end onto the polyethylene pipe. After the tube end is pressed onto the pipe, multiple short poly plugs are heat-welded to the outer surface of the polyethylene pipe through the prepunched or predrilled holes previously disposed through the tube end. An O-ring is placed between the tube end and the polyethylene pipe to provide a hydraulic seal.

All of the above designs have experienced failures with either or both the hydraulic seal and the mechanical locked integrity of the tube end on the end of the polyethylene pipe. Sometimes these failures are catastrophic in that the tube end forcefully blows off the end of the pipe due to internal pressure or exterior mechanical strain causing rupture of the integrity of the pipeline and, sometimes, a danger to those in the nearby vicinity. Accordingly, it would be desirable to have a tube end that provides both a mechanical locked interface and a hydraulic seal with the outside diameter of the polyethylene pipe such that the need for O-rings are dispensed with and provide a mechanical integrity up to and exceeding the integrity test pressures of the polyethylene pipe.

SUMMARY OF THE INVENTION

Briefly, the present invention comprises a tube end formed of any suitable material, such as, for example, steel, reinforced plastic, copper, stainless steel, or brass, having the shape of a truncated cylinder that is forced over the end of a polyethylene pipe and prior or post heat-treated to provide a THERMO LOCK-N-SEAL TM interface between the OD of the polyethylene pipe and the ID of the tube end by melting a portion of the OD of the polyethylene tube sufficient to cause thermal plastic flow of the polyethylene into conformity with the surface of the ID of the tube end. This thermal plastic flow into conformity with the surface of the ID of the tube end provides greatly increased surface area of the interface for mechanical integrity and a hydraulic seal at the interface, thereby eliminating the need for epoxies, adhesives, or O-ring conventional seals. Three embodiments of the structure of the surface of the ID of the tube end are described that produce increased surface area and mechanical interlocks for the interface with the polyethylene pipe. A raised ridge opposite a groove pressed into the OD of the tube end which raised ridge has multiple grooves formed in it and two types of formed barbed appendages disposed on the inner surface of the tube end. The first barbed appendage is in the form of an inner flange formed at the interior end of the truncated cylindrical tube end which flange is rolled in backwards toward the opposite end. The second barbed appendage includes multiple individual barbs pressed, punched, or otherwise disposed along the ID surface of the truncated cylinder so as to extend beyond the ID and in a direction opposite the direction of assembly of the tube end on the polyethylene tube. These barbed flanges and appendages are surrounded on both sides by the plastic flow of the predetermined depth of the OD of the polyethylene tube and, when the tube end is installed in place, provides greatly increased surface area for the interface with the barbed appendage that is disposed in the inner wall of the polyethylene pipe and provides great resistance to movement when pressure conducted by the polyethylene pipe would normally urge the tube end to separate. The barbed appendages embodiments have the advantage of providing a plastic deformation bead of polyethylene at the appendage for visual notice that the THERMO LOCK-N-SEAL TM interface has been accomplished.

The method for producing the thermal lock and seal interface between the tube end and the polyethylene tube is to put the interface between the two surfaces into compression by press assembly and apply prior or post heating of the tube end to cause the plastic deformation of the predetermined depth of outer surface of the polyethylene pipe. The advantage of prior heating is the outer surface of the polyethylene pipe acts as a lubricant for the assembly of the tube end.

Other objects, advantages, and capabilities of the present invention will become more apparent as the description proceeds.

BRIEF DESCRIPTION OF THE DRAWINGS

The invention may be better understood and further advantages and uses thereof may become more readily apparent when considered in view of the following detailed description of exemplary embodiments, taken with the accompanying drawings, in which.

DETAILED DESCRIPTIONS OF THE PREFERRED EMBODIMENTS

Figure 1:
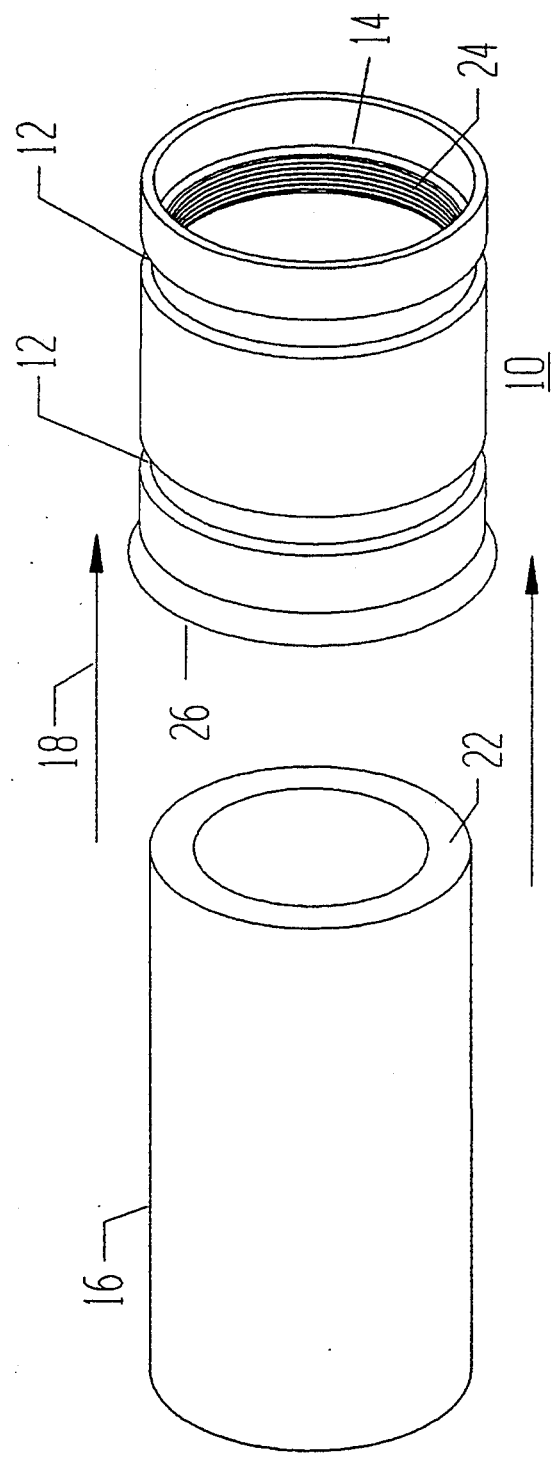
FIG. 1 is an isometric view of a cylindrical tube end having a groove formed into the OD causing a raised ridge on the ID, which raised ridge contains a predetermined number of grooves, the tube end being shown adjacent and aligned with a polyethylene pipe for assembly thereon, all according to the teachings of the invention.

Referring now to the drawings and, in particular, to FIG. 1, there is shown an isometric view of tube end 10 having groove 12 disposed therein, which groove 12 is usually pressed into the OD of tube end 10 but may be otherwise disposed as by rolling, casting, or otherwise forming thereon. The forming of groove 12 on tube end 10 causes raised ridge 14. Tube end 10 is pressed on polyethylene pipe 16 by means of a hydraulic press or other method known in the art in the directions of arrows 18. Tube end 10 is usually sized to have the same OD as polyethylene pipe 16 and, if, for instance, tube end 10 has a ⅛ inch thickness, it can be readily appreciated that upon hydraulic pressing onto polyethylene pipe 16 the pipe wall 22 of polyethylene pipe 16 is thereby placed in compression.

Figure 2:
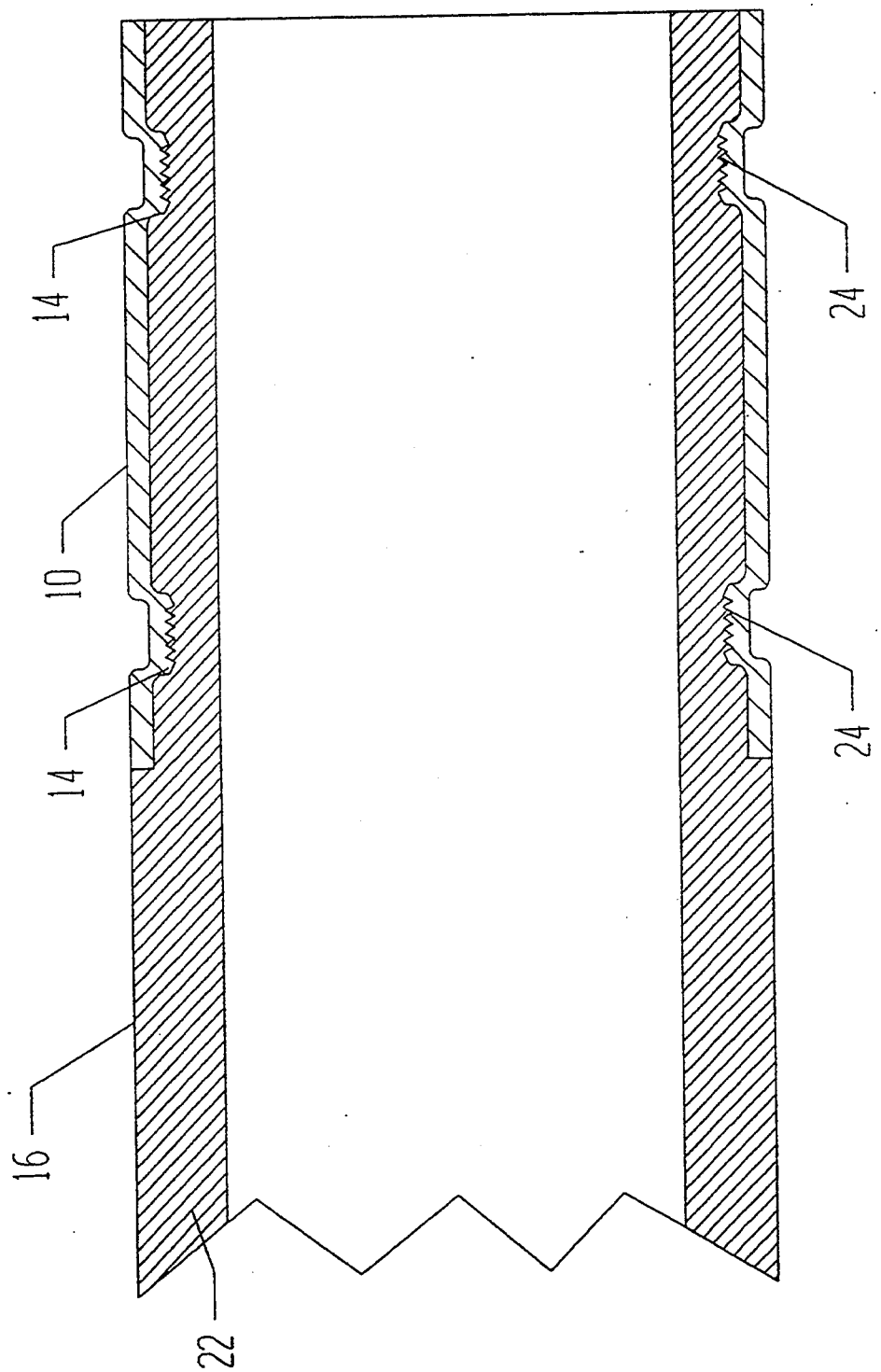
FIG. 2 is a cross-sectional view of the tube end of FIG. 1 fully assembled over the polyethylene tube according to the teachings of the invention.

A cross-sectional view of tube end 10 assembled over polyethylene pipe 16 is shown in FIG. 2, and it can be readily appreciated that pipe wall 22 of polyethylene pipe 16 is subjected to compression especially in the area of raised ridge 14, which raised ridge 14 is serrated by means of having multiple grooves 24 disposed therein. The number of grooves 24 and physical characteristics of the grooves are dependent upon the amount of surface area interface desired. Ridge 14 in this preferred embodiment contains four (4) grooves 24, each being a predetermined width and depth, such as, for example, 0.070 inches wide and 0.060 inches deep. Microgrooves 24 may further be disposed along the entire ID of tube end 10 for greater surface interface with polyethylene tube 16. Microgrooves 24 may also vary in physical dimension depending on the interface desired. Tube end 10 may further include flange 26 disposed on the end thereof to facilitate assembly over polyethylene pipe 16.

Figure 3:
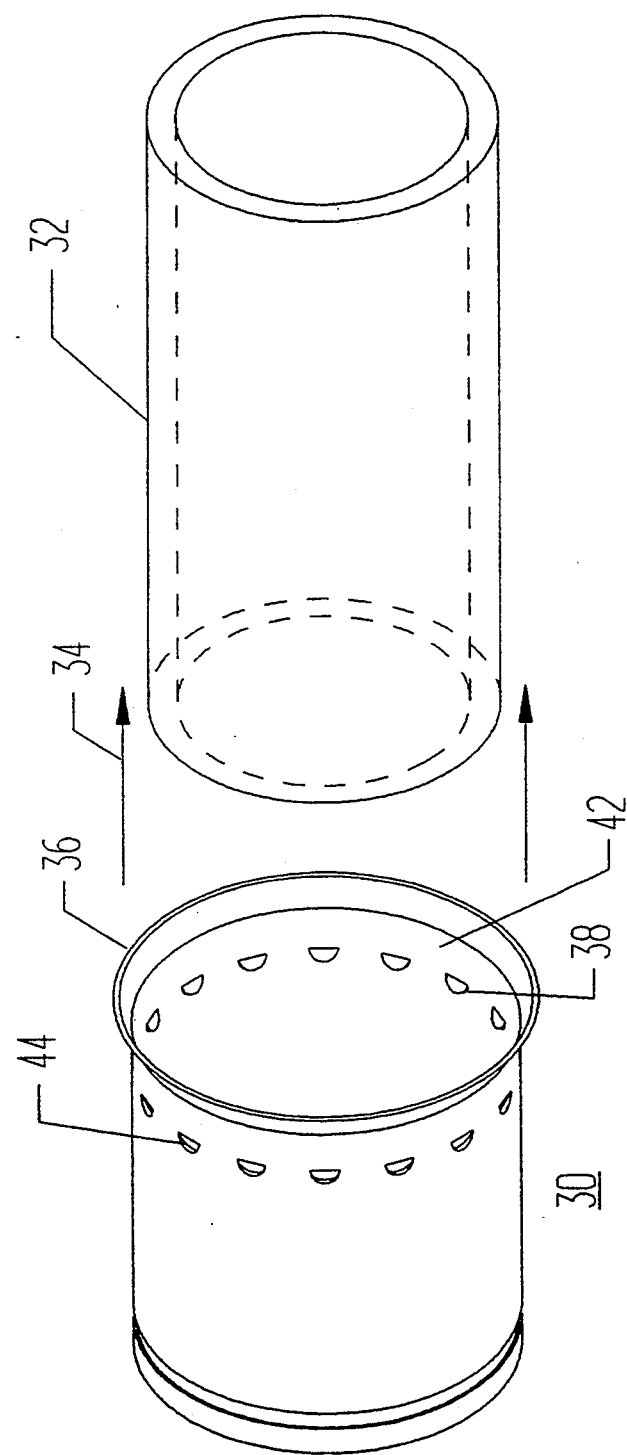
FIG. 3 is an isometric view of a cylindrical tube end including a series of half-moon barbs punched around the OD of the cylinder protruding through into the ID of the cylinder, which tube end sits adjacent and in line with a polyethylene pipe and is to be assembled according to the teachings of the invention.

Referring now to FIG. 3, there is shown an isometric view of tube end 30 adjacent and prior to assembly over polyethylene pipe 32 in the direction of arrows 34. Tube end 30 includes flange 36 to facilitate assembly over polyethylene pipe 32 which is normally done by means of a hydraulic press or other methods of forcing tube end 30 over polyethylene pipe 32. Tube end 30 includes a multiplicity of half-moon barbs 38 disposed in predetermined locations along the ID surface 42 of tube end 30, which half-moon barbs result from a series of half-moon holes 44 punched in the OD of tube end 30.

Figure 4:
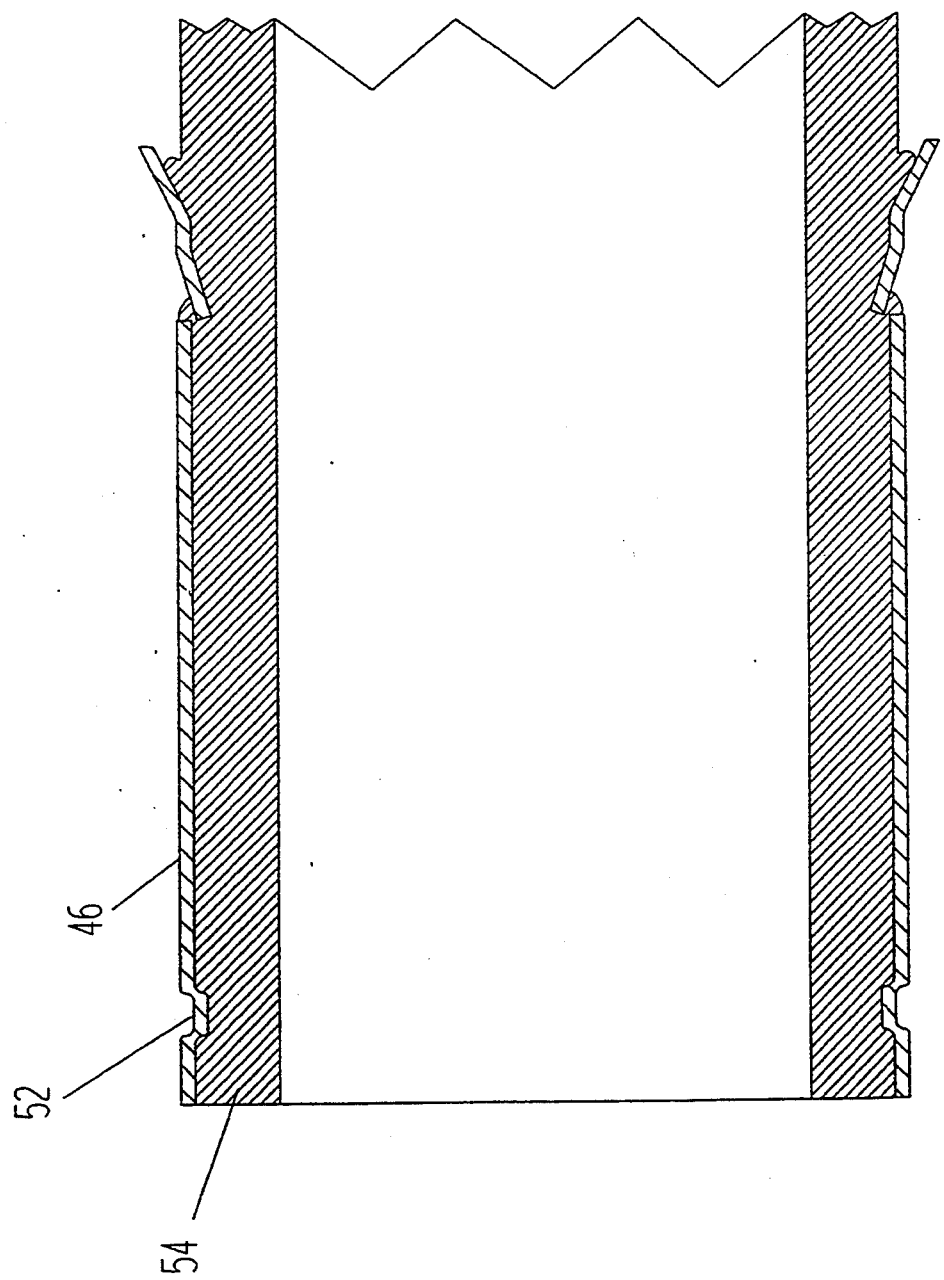
FIG. 4 is a cross-sectional view of the tube end of FIG. 3 fully assembled over the polyethylene tube according to the teachings of the invention.

Referring now to FIG. 4, there is shown a cross-sectional view of tube end 30 assembled over polyethylene pipe 32 which assembly, as described above, placed pipe wall 46 into compression especially at the area where groove 52 is disposed and where half-moon barbs 38 are disposed down into a predetermined depth along the thickness 54 of polyethylene pipe 32.

Figure 5:
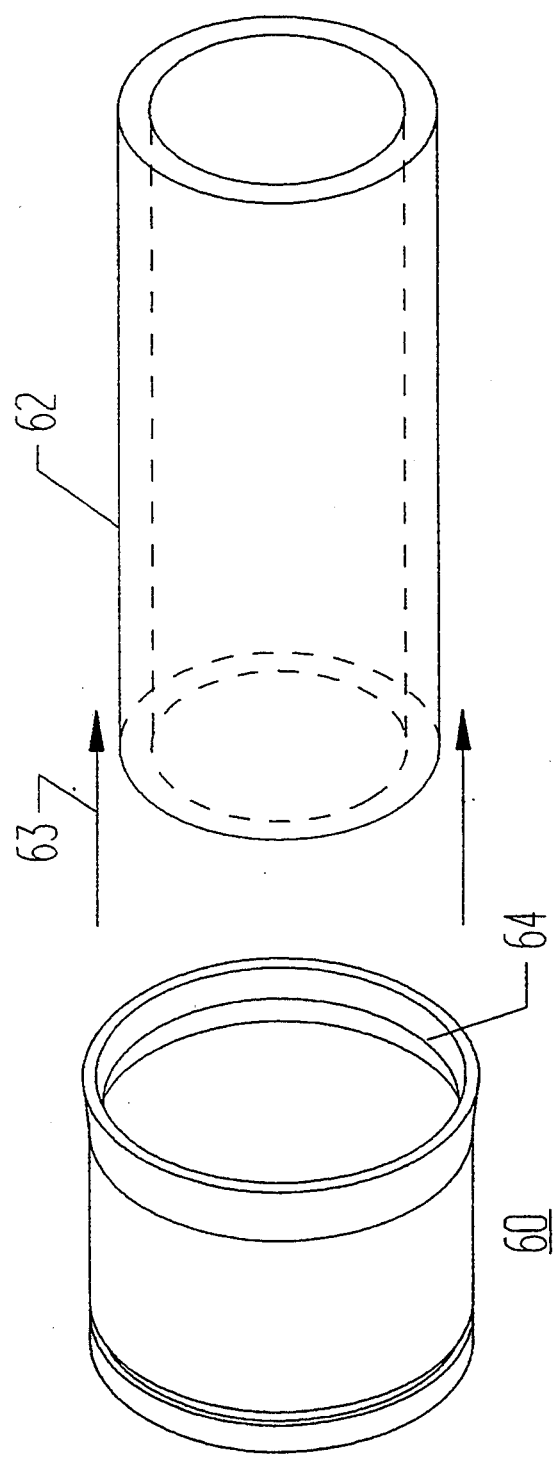
FIG. 5 is an isometric view of a cylindrical tube end having a barbed flange rolled into the end of the cylinder, which tube end sits adjacent and in line with a polyethylene pipe for assembly thereon in the direction of the arrows shown.

Referring now to FIG. 5, there is shown tube end 60 adjacent and aligned with polyethylene pipe 62 for forced, pressed assembly thereon in the direction of arrows 63 by means of a hydraulic press or other known methods in the art as described above. Tube end 60 now includes flange 68 disposed on one end thereof, as may be shown more clearly in the cross-section view of FIG. 6, which flange 64 is disposed below the ID 68 of tube end 60 so as to cause increased pressure on sidewall 72 of polyethylene pipe 62 and increased pressure is also apparent to be placed at the location of groove 74 disposed on the inner surface 68 of polyethylene pipe 62.

Figure 6:
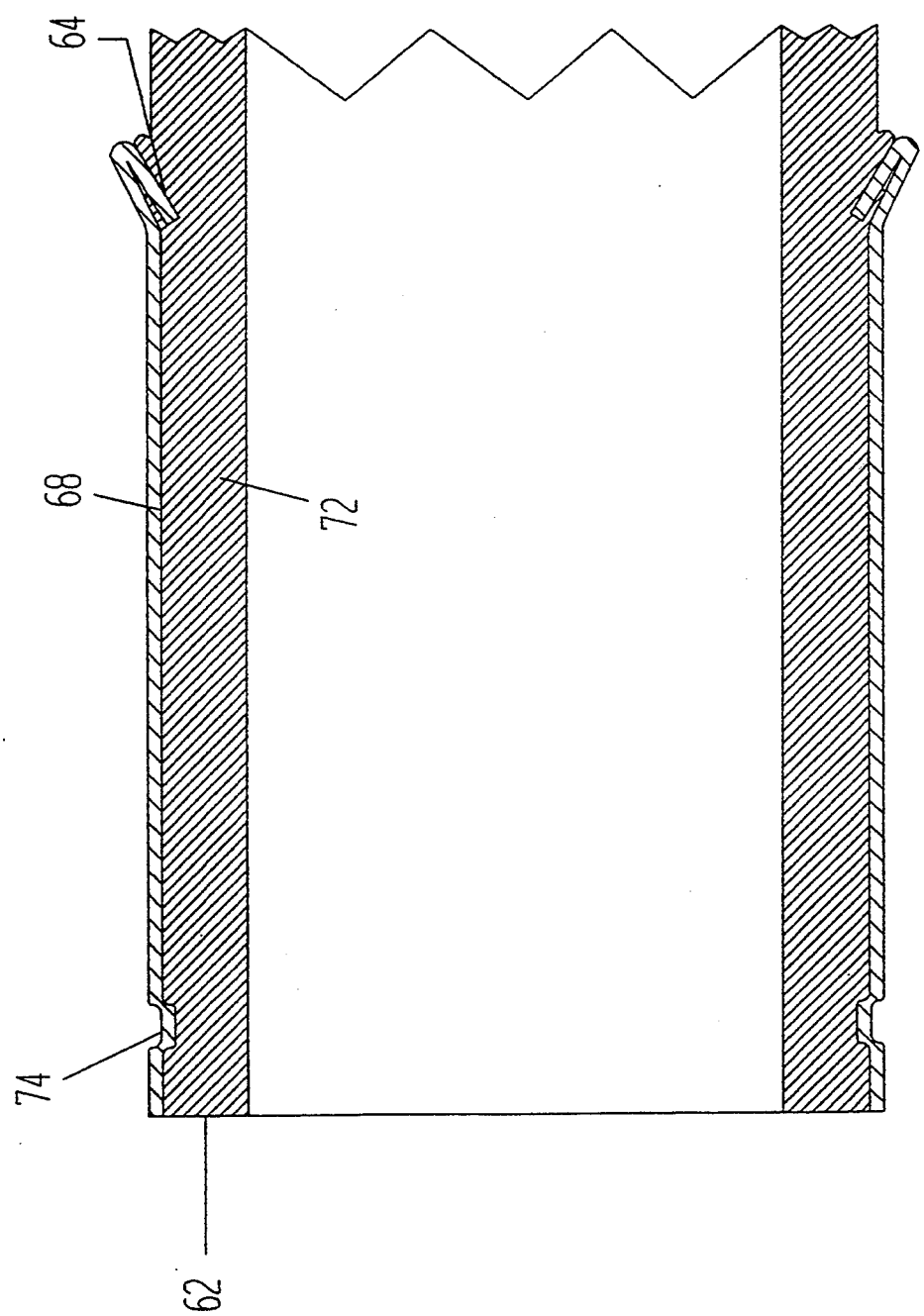
FIG. 6 is a cross-sectional view of the tube end of FIG. 5 fully assembled over the polyethylene tube according to the teachings of the invention.

FIGS. 2, 4, and 6 show tube ends assembled on polyethylene tubes such as by pressing the tube end over the polyethylene tube. Tube ends have been pressed onto polyethylene tubes in the prior art. According to the teachings of the invention, however, the tube end must be either preheated or post-heated during installation on the polyethylene pipe to thereby cause thermal plasticized flow of a predetermined depth of the OD of polyethylene substrate material to flow around and conform to the interior of the tube end with whatever recessions or projections, such as, for instance, barbs of steel, a barbed flange, or the raised ridge containing serrated grooves as shown in the preferred embodiments of FIGS. 1, 3, and 5, respectively. This thermal plasticized flow of polyethylene conforming to the interior of the tube end causes a mechanical lock which prevents the fitting from moving on the pipe due to hydrostatic pressure or longitudinal stress due to thermal expansion or contraction or gravitational stresses in the piping system. The thermal plasticized flow of polyethylene substrate material conforming to the interior of the tube end also forms a hydraulic seal and eliminates the necessity of adhesives, epoxies, or O-rings, since the flowing of the plasticized polyethylene materials conforms so tightly to the interior of the tube end that a hydraulic seal is provided. It is necessary to keep in mind when assembling the tube end over the polyethylene pipe that only enough heat necessary to thermal plasticize a predetermined depth of the polyethylene pipe wall to promote the thermal lock and seal is necessary. It is imperative that the thermal plasticized flow does not occur across the entire sidewall of the polyethylene pipe or the interface between the tube end and the polyethylene pipe will not be in sufficient compression to cause the mechanical integrity and hydraulic seal necessary according to the teachings of the invention. Therefore, quenching of the tube end after a predetermined heating time may be necessary.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A tube end attached to an end of a piece of polyethylene type pipe having a pipe wall having an external diameter, said tube end comprising:

an annular member having an external diameter, an internal diameter, and a wall thickness, the external diameter of the annular member being substantially equal to said external diameter of said pipe wall of said piece of polyethylene type pipe, the internal diameter of the annular member being smaller than the external diameter of said pipe wall of said piece of polyethylene pipe, the annular member having at least one integral raised ridge extending inwardly from the internal diameter of the annular member, the integral raised ridge having a plurality of integrally formed grooves therein;

the annular member compressing said pipe wall of said piece of polyethylene type pipe when the annular member is installed thereon thereby securing the annular member in sealing engagement with said piece of polyethylene type pipe.

2. The tube end of claim 1 further comprising an annular groove in the external diameter of the annular member, the annular groove forming the integral raised ridge extending upwardly from the internal diameter of the annular member.

3. The tube end connector of claim 1 further comprising:

a flanged portion of one end of the annular member for assembling the annular member on said piece of polyethylene type pipe.

4. The tube end of claim 1 further comprising:

a plurality of raised ridges on the internal diameter of the annular member, each raised ridge having a plurality of integral grooves formed therein.

5. In combination, a tube end and a piece of polyethylene type pipe having an external diameter and opposing ends, said tube end installed on one end of said opposing ends of said polyethylene type pipe, said tube end comprising:

an annular member having an external diameter, internal diameter, and a wall thickness, the external diameter of the annular member being substantially equal to said external diameter of said polyethylene type pipe, the internal diameter of the annular member being smaller than the external diameter of said polyethylene type pipe, the annular member having at least one integral raised ridge extending inwardly from the internal diameter of the annular member for engaging the external diameter of said polyethylene type pipe, the integral raised ridge having a plurality of integral grooves thereon extending into the thickness of the annular member for engaging said external diameter of said polyethylene type pipe, wherein the annular member compresses an end of said opposing ends of said polyethylene type pipe when installed thereon and upon heating of a portion of the external diameter of the annular member which overlays the raised ridge extending inwardly from the internal diameter of the annular member causes the thermal plasticized flow of a portion of said polyethylene type pipe to flow around and conform to the internal diameter of the annular member forming a securing and sealing engagement of the annular member to said polyethylene type pipe while the annular member maintains said one end of said opposing ends of said polyethylene pipe in compression.

6. The combination of claim 5 further comprising an annular groove in the external diameter of the annular member, the annular groove forming the integral raised ridge extending inwardly from the internal diameter of the annular member.

7. The combination of claim 5 further comprising a ranged portion on one end of the annular member for assembling the annular member on said piece of polyethylene type pipe.

8. The combination of claim 5 further comprising a plurality of raised ridges extending inwardly from the internal diameter of the annular member, each raised ridge having a plurality of integral grooves formed therein.

* * * * *